(12) United States Patent
Zhai et al.

(10) Patent No.: US 7,046,306 B2
(45) Date of Patent: May 16, 2006

(54) PROCESSING A VIDEO SIGNAL USING MOTION ESTIMATION TO SEPARATE LUMINANCE INFORMATION FROM CHROMINANCE INFORMATION IN THE VIDEO SIGNAL (75) Inventors: Fan Zhai, Plano, TX (US); Karl H. Renner, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 10/404,191

(22) Filed: Mar. 31, 2003

(65) Prior Publication Data

US 2004/0189875 A1 Sep. 30, 2004

(51) Int. Cl.
*D06F 71/08* (2006.01)
(52) U.S. Cl. .................. 348/666; 348/669; 348/665
(58) Field of Classification Search ........ 348/663–670, 348/450, 451; H04N 9/78
See application file for complete search history.

(56) References Cited

U.S. PATENT DOCUMENTS

| 4,686,977 | A | * | 8/1987 | Cosma | 128/207.17 |
| 4,703,341 | A | * | 10/1987 | Willis | 348/562 |
| 4,716,462 | A | * | 12/1987 | Wargo et al. | 348/701 |
| 4,868,650 | A | * | 9/1989 | Weckenbrock | 348/701 |
| 5,206,715 | A | * | 4/1993 | Jung et al. | 348/664 |
| 5,990,978 | A | * | 11/1999 | Kim et al. | 348/663 |
| 6,300,985 | B1 | * | 10/2001 | Lowe et al. | 348/665 |
| 6,774,954 | B1 | * | 8/2004 | Lee | 348/665 |

OTHER PUBLICATIONS

"TV Comb Filter" http://members.aol.com/ajaynejr/vidcomb.htm , 20 pages, Mar. 31, 2003.

* cited by examiner

*Primary Examiner*—Michael H. Lee
(74) *Attorney, Agent, or Firm*—J. Dennis Moore; W. James Brady, III; Frederick J. Telecky, Jr.

(57) ABSTRACT

In one embodiment, a method for processing a video signal includes: (1) receiving and storing luminance and chrominance information for each pixel in a first portion of the signal; (2) receiving luminance and chrominance information for each pixel in a second portion of the signal; (3) determining an estimated motion vector for each particular pixel of the second portion by comparing the luminance and chrominance information of the particular pixel to the stored luminance and chrominance information for one or more pixels in a search area of the first portion to determine a pixel in the search area that most closely matches the particular pixel and determining the estimated motion vector according to the particular pixel and the most closely matching pixel; (4) using the estimated motion vector to access the chrominance information for the most closely matching pixel; (5) using a three-dimensional comb filter to filter the chrominance information for the particular pixel and for the most closely matching pixel to determine three-dimensional filter output chrominance information for the particular pixel; (6) receiving the three-dimensional output chrominance information and if the chrominance information for the particular pixel matches the chrominance information of the most closely matching pixel within a specified tolerance, using the three-dimensional filter output chrominance information to determine output luminance information for the particular pixel; and (7) providing the three-dimensional output chrominance information and output luminance information for the particular pixel for displaying the particular pixel.

31 Claims, 4 Drawing Sheets

PROCESSING A VIDEO SIGNAL USING MOTION ESTIMATION TO SEPARATE LUMINANCE INFORMATION FROM CHROMINANCE INFORMATION IN THE VIDEO SIGNAL

TECHNICAL FIELD OF THE INVENTION

This invention relates generally to video signal processing and more particularly to processing a video signal using motion estimation to separate luminance information from chrominance information in the video signal.

BACKGROUND OF THE INVENTION

A composite video signal generally contains programming information and at least two other components: (1) luminance information (grayscale information generally sufficient to make a black and white image in substantially fall detail); and (2) chrominance information (coloration information). The luminance and chrominance information may partially share the same range of frequencies. Various electronic devices such as televisions and video cassette recorders generally contain a filter or other architecture for separating the luminance and chrominance information. In analog electronic devices, separation of luminance and chrominance information may be achieved using, in ascending order of typical desirability, a one-dimensional ("horizontal") comb filter, a two-dimensional ("vertical") comb filter, or a three-dimensional ("temporal") comb filter.

Two-dimensional comb filters may enable substantial elimination of hanging dots by adaptively switching between horizontal and vertical comb filters based upon the content of a scene, for example. Three-dimensional comb filters may enable temporal comb filtering involving successive frames. Three-dimensional comb filters may, in some cases, achieve essentially perfect separation of luminance and chrominance information, eliminating substantially all dot crawl and rainbow swirls for stationary subject matter and may perform at least as well as two-dimensional comb filters for the rest of the image. Thus, it may be desirable to maximize use of a three-dimensional comb filter. In general, however, three-dimensional comb filters may achieve the best results when used for still frames or for those portions of consecutive frames not affected by motion or change of scene because there may be some loss of quality, such as dot crawl or hanging dots, as the subject moves from one frame to the next. If there is subject motion, comb filter logic, such as a motion detector, may sense the existence of motion and switch from use of a three-dimensional comb filter to use of the less-desirable two-dimensional comb filter.

SUMMARY OF THE INVENTION

According to the present invention, disadvantages and problems associated with previous techniques for processing a video signal.

In one embodiment, a system is provided for processing a video signal that includes information for a number of frames, each frame representing an image and including a number of pixels each having luminance information and chrominance information. A motion estimator receives the luminance information and chrominance information for each pixel in a first predetermined portion of the video signal, the first predetermined portion including at least a first frame, and stores the received luminance information and chrominance information for the pixels in the first predetermined portion of the video signal. The motion estimator receives the luminance information and chrominance information for each pixel in a second predetermined portion of the video signal, the second predetermined portion including at least a second frame. For each particular pixel of the second predetermined portion, the motion estimator determines an estimated motion vector for the particular pixel of the second predetermined portion by comparing the luminance information and chrominance information of the particular pixel of the second predetermined portion to the stored luminance information and chrominance information for one or more pixels in a search area of the first predetermined portion to determine a pixel in the search area of the first predetermined portion that most closely matches the particular pixel of the second predetermined portion. The motion estimator determines the estimated motion vector according to the particular pixel of the second predetermined portion and the most closely matching pixel in the search area of the first predetermined portion, the estimated motion vector being used to access the chrominance information for the most closely matching pixel in the search area of the first predetermined portion. A three-dimensional comb filter filters the chrominance information for the particular pixel of the second predetermined portion and the chrominance information for the most closely matching pixel in the search area of the first predetermined portion to determine three-dimensional filter output chrominance information for the particular pixel of the second predetermined portion. An output processor receives the three-dimensional output chrominance information for the particular pixel of the second predetermined portion, and if the chrominance information for the particular pixel of the second predetermined portion matches the chrominance information of the most closely matching pixel in the search area of the first predetermined portion within a specified tolerance, the output processor uses the three-dimensional filter output chrominance information to determine output luminance information for the particular pixel of the second predetermined portion. The output processor compiles the three-dimensional output chrominance information for the particular pixel and the output luminance information for the particular pixel for displaying the particular pixel.

Particular embodiments of the present invention may provide one or more technical advantages. For example, in certain embodiments, a motion estimator may determine a motion vector between a pixel in a first portion of a video signal (e.g., a current frame) to a corresponding pixel in a second portion of the video signal (e.g., a previous frame) having substantially similar luminance information and chrominance information. The use of motion estimation may allow the three-dimensional comb filter to be applied not only to static pixels, but also to pixels that move from one frame to the next. This capability may substantially reduce or eliminate the need to revert to a two-dimensional comb filter when there is pixel motion from one frame to the next, thus increasing the number of pixels in a frame to which the three-dimensional comb filter may be applied and possibly maximizing the achievable bandwidth for both luminance and chrominance information. Maximizing the application of the three-dimensional comb filter to pixels represented by a received video signal may reduce the presence of false color, rainbow swirls, dot crawl on vertical image edges, hanging dots on horizontal image edges, and other problems associated with prior techniques. In certain embodiments, the present invention may improve the quality of the separation of the luminance information from the chrominance information in a received video signal, such that when the luminance and chrominance information is applied to a display the picture quality may be improved. For example, such improved picture quality may include sharper images with better definitions and with little false color and vertical resolution loss.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

Figure 1A:
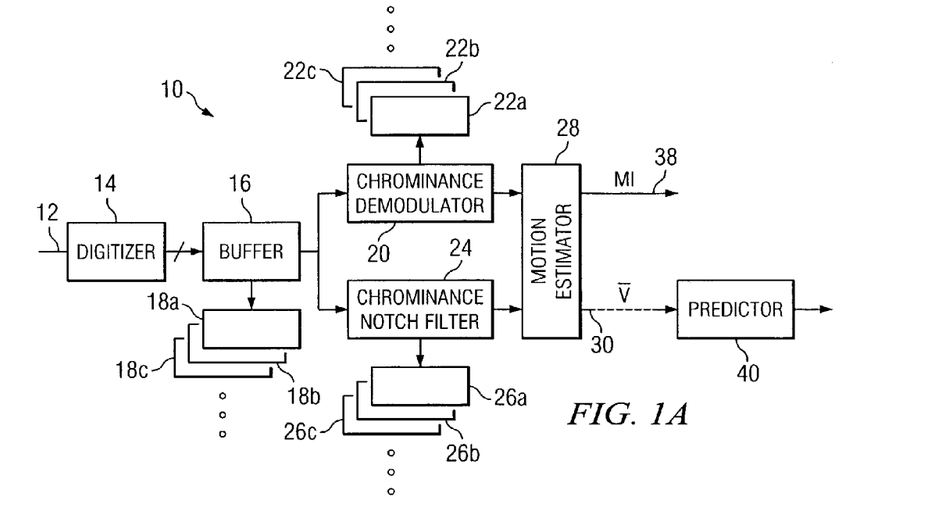
FIGS. 1A–1B illustrate an example system for processing a video signal.
Figure 1B:
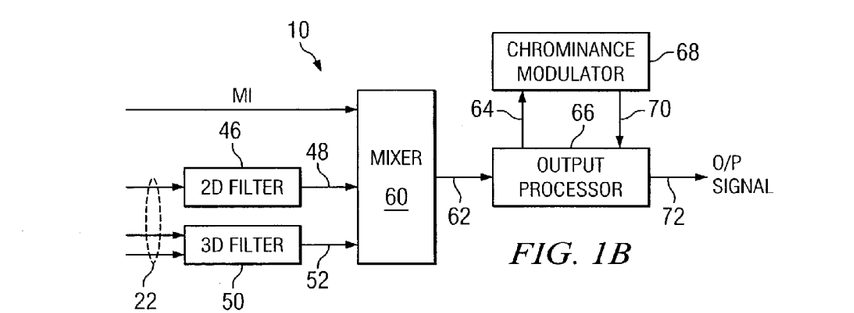

FIGS. 1A–1B illustrate an example system 10 for processing a video signal 12. Video signal 12 may be a composite video signal that includes information for a number of frames, each frame representing an image. Each frame may include a number of pixels, each pixel having luminance information and chrominance information. The luminance information may generally specify greyscale information generally sufficient to display a black and white image in substantially full detail, and the chrominance information may generally specify color information. In certain embodiments, video signal 12 may also include programming information associated with the frames. Video signal 12 may be in analog format, digital format, or in any other suitable format. Video signal 12 may be a National Television System Committee (NTSC) video signal, Phase Alteration Line (PAL) video signal, or any other suitable type of video signal. The luminance and chrominance information may partially share the same range of frequencies in video signal 12. In general, system 10 is capable of separating the luminance information and the chrominance information in video signal 12, using motion estimation and a three-dimensional comb filter. System 10 may be incorporated into a television, video cassette recorder, laser disc player, or any other suitable electronic device that processes a video signal.

As illustrated in FIG. 1A, in an embodiment in which video signal 12 is an analog signal, system 10 may include a digitizer 14 to digitize video signal 12 as video signal 12 is received. If video signal 12 is received as a digital video signal or after digitizer 14 has digitized video signal 12, portions 18 of video signal 12 may be stored in a buffer 16. Although described as a buffer, buffer 16 may include any suitable data storage arrangement. A portion 18 of video signal 12 may include an entire frame, an entire frame plus a number of lines from the immediately subsequent frame, or any other suitable portion of video signal 12 according to particular needs. In one embodiment, portion 18 includes an entire frame plus sixteen lines of the immediately subsequent frame. For example, as video signal 12 is received and digitized, consecutive frames of video signal 12 may be stored in buffer 16 as portion 18a (first frame plus sixteen lines of second frame), portion 18b (second frame plus sixteen lines of third frame), portion 18c (third frame plus sixteen lines of fourth frame), and so on.

A chrominance demodulator 20 may perform chrominance demodulation on video signal 12 to obtain the chrominance information for each pixel. For example, chrominance demodulator 20 may access each portion 18 and determine the chrominance information for each pixel of the portion 18. Chrominance demodulator 20 may store the chrominance information for the pixels of each portion 18 as chrominance information 22. For example, chrominance information 22 for the pixels of portion 18a may be stored as chrominance information 22a. Chrominance demodulator 20 may also apply low-pass filtering to chrominance information 22 to reduce crosstalk.

Theoretically, there are at least two feasible architectural implementations for separation of chrominance information 22 from the luminance information; one in the composite domain (prior to chrominance demodulation) and the other in the chrominance baseband domain (after chrominance demodulation). Correspondingly, three-dimensional comb filters may have two different types. In certain embodiments, it may be impractical to design a three-dimensional comb filter to accomplish separation of chrominance information 22 from the luminance information in the composite domain based on two composite pixel inputs obtained using motion estimation. Thus, the chrominance baseband domain architecture may be preferable. This may involve demodulating chrominance information 22 and generating two color difference signals (U and V), which are low-pass filtered to remove high order harmonics of chrominance sub-carrier frequency. Chrominance information 22 then be remodulated, and subtracted from video signal 12 to determine the luminance information.

Generally, the two color difference signals U and V are produced through chrominance demodulation and low-pass filtering, during which false color may be generated due to luminance frequencies near the chrominance sub-carrier frequency. False color is generally unavoidable in demodulation since chrominance information 22 and the luminance information partially share the same frequency range. From the interlaced frequency spectrum of NTSC, for example, the strongest false color ($f_{fc}$) remaining after chrominance demodulation and low-pass filtering may be located at frequency $f_{sc} \pm f_h/2$, where $f_{sc}$ is the chrominance sub-carrier frequency and $f_h$ is the horizontal frequency. In the following discussion, it is assumed that the other frequency false colors may be ignored and only the false color with frequency $f_{fc} = f_{sc} \pm f_h/2$ is considered.

Figure 2A:
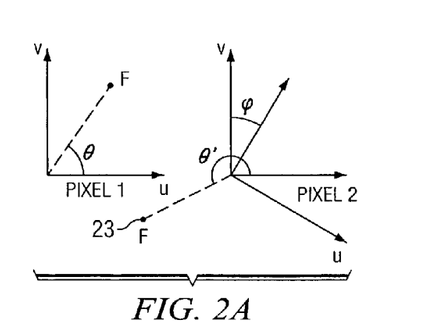
FIGS. 2A–2B illustrate example graphical representations of false color for a pixel in composite domain and chrominance baseband domain, respectively.

In certain embodiments, a comb filter such as a three-dimensional comb filter may be designed to eliminate false color and spurious chrominance information 22 in the luminance information based on the phase relationship (i.e. frame-to-frame) of color difference and false color between two arbitrary pixels. Colors may be defined on a vector diagram where u and v represent the axes, as shown in FIG.

2A, which depicts the chrominance demodulation of false color of two pixels with perfect correlation in consecutive portions 18. Assume U and V denote the true color differences and (F, θ)/(F, θ') denotes the false color, which is represented by a dot 23 where F is the amplitude of the false color and θ/θ' is the phase of the false color. This may be interpreted as the color differences and false color representation in the composite domain (i.e. prior to chrominance demodulation).

In the example vector representation illustrated in FIG. 2A, the chrominance information u and v of pixel-2 are obtained by rotating the vector of pixel-1 at the chrominance sub-carrier frequency, while the false color may be rotated at frequency $f_{fc}=(f_{sc}+f_h/2)$. Assume the motion vector between these two pixels is (x, y), and the time interval is τ, where τ=(−525 lines delay −y lines delay −x horizontal pixel delay) or $(-525 t_h-yt_h-xt_p)$, $t_h$ being the period of a horizontal line and $t_p$ being the time interval between two adjacent horizontal pixels. On these assumptions, the corresponding chrominance phase shift may be $\phi=2\pi f_{sc}\tau$, and the corresponding false color phase shift may be $\gamma=2\pi f_{fc}\tau$. In the following discussion, only false color with frequency $f_{sc}+f_h/2$ is considered since false color with frequency $f_{sc}-f_h/2$ may generally be analyzed in the same way. Assuming an incoming video signal 12 is an NTSC video signal, one line delay may correspond to approximately a 180 degree phase shift and one horizontal pixel delay may correspond to $2\pi/f_s{}^*f_{sc}$ or α, where $f_s$ is the sampling frequency. The phase shift of color, γ, may be expressed according to the following formula:

$$\gamma=2\pi f_{fc}\tau=2\pi(f_{sc}+f_h/2)\tau=2\pi*228f_h(-525t_h-yt_h-xt_p)$$

The term $-525t_h-yt_h$ may be dropped from the equation because y is generally an integer number and, therefore, the multiplication of $f_h(-525t_h-yt_h)$ is an integer number. Because the equation represents the phase shift of γ, 2kπ may be equivalent to the phase shift zero. Thus, the equation for γ may become:

$$-2\pi*228f_h xt_p=-2\pi f_{sc}xt_p(1+0.05/227.5)\approx-x\alpha$$

Thus, θ'=θ−γ=θ+xα. Since these two pixels are supposed to have the same color difference and luminance information, it may be preferable to assume that the amplitudes of their false colors are the same.

Figure 2B:
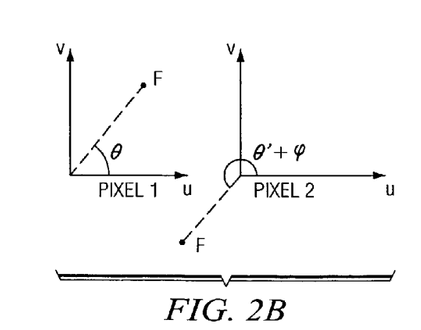

FIG. 2B illustrates example color differences and false color in the chrominance baseband domain (i.e. after chrominance demodulation). This may be obtained through chrominance demodulation of the corresponding video signals 12 shown in FIG. 2A. In one embodiment, chrominance demodulator 20 may multiply video signal 12 by the sine and cosine of the chrominance sub-carrier frequency, which produces the sum and difference of the input and local oscillator frequencies. Chrominance low-pass filtering may filter out the sum frequency and pass the difference frequency. Assuming $(u_1, v_1)$ and $(u_2, v_2)$ are the obtained color difference components of pixel-1 and pixel-2, respectively, after chrominance demodulation and low-pass filtering, the vector diagrams of the two pixels in the chrominance baseband domain may simply be a rotated version of those in the composite domain to a fixed reference.

If the motion vector corresponding to $(u_2, v_2)$ is (x, y), then:

$$\text{Pixel-1:} \begin{cases} u_1 = U + F\cos\theta \\ v_1 = V + F\sin\theta \end{cases} \quad (1.1)$$

$$\text{Pixel-2:} \begin{cases} u_2 = U + F\cos(\theta' + \varphi) \\ v_2 = V + F\sin(\theta' + \varphi) \end{cases}$$

Since θ +φ=θ+xα+π−xα=π+θ, pixel 2 may be rewritten as:

$$\text{Pixel-2:} \begin{cases} u_2 = U - F\cos\theta \\ v_2 = V - F\sin\theta \end{cases} \quad (1.2)$$

Returning to FIG. 1A, chrominance notch filter 24 may be applied to video signal 12 to obtain the luminance information for the pixels of each portion 18. For example, chrominance notch filter 24 may access portions 18 and determine chrominance information 22 for each pixel of each portion 18. Chrominance notch filter 24 may subtract the determined chrominance information 22 from the video signal 12 to determine the luminance information for the pixels of each portion 18. Chrominance notch filter 24 may store the luminance information for the pixels of each portion 18 as luminance information 26. For example, luminance information 26 for the pixels of portion 18a may be stored as luminance information 26a.

A motion estimator 28 may calculate an estimated motion vector 30 for each pixel of each portion 18. Motion estimator 28 may apply an algorithm such as a block matching algorithm that compares the chrominance information 22 and luminance information 26 of a particular pixel of a second portion 18 to the chrominance information 22 and luminance information 26 for one or more pixels in a search area of a first portion 18 to determine a pixel in the search area that most closely matches the particular pixel of the second portion 18. In one embodiment, second portion 18 is immediately subsequent to first portion 18 (e.g., a second frame plus sixteen lines of a third frame is considered immediately subsequent to a first frame plus sixteen lines of the second frame). For example, motion estimator may apply the algorithm to compare the chrominance information 22b and luminance information 26b of a particular pixel of a second portion 18b to the chrominance information 22a and luminance information 26a of one or more pixels in a search area of a first portion 18a to determine a pixel in the search area of first portion 18a that most closely matches the pixel of second portion 18b. In one embodiment, chrominance demodulator 20 and chrominance notch filter 24 may communicate chrominance information 22 and luminance information 26, respectively, to motion estimator 28. In another embodiment, motion estimator 28 may access chrominance information 22 and luminance information 26 from one or more suitable storage locations.

The analysis of motion in a video signal 12 is part of many advanced video processing techniques. Different applications may demand different types of motion estimators 28. In a case of predictive coding, estimated motion vectors may minimize the prediction error, which may need to be coded and transmitted. The motion vectors may not reflect the true motion of pixels. For motion compensated Frame Rate Conversion (FRC), interpolation may be realized along the motion trajectory. In the context of three-dimensional comb filters, motion vectors may determine the phase relation between two pixels (e.g., between a pixel in portion 18b and a pixel in portion 18a), and thus correct cancellation of false color in the designed comb filter. Thus, it may be preferable that the motion vectors describe the true motion of pixels from portion 18a to portion 18b within video signal 12. Generally, predictive coding may be the least demanding on motion estimation, and FRC and three-dimensional comb filtering may be the most demanding, as true motion is preferable. Thus, in certain embodiments, it may be preferable for motion estimator 28 to be designed for FRC or three-dimensional comb filtering rather than for predictive coding.

Figure 3:
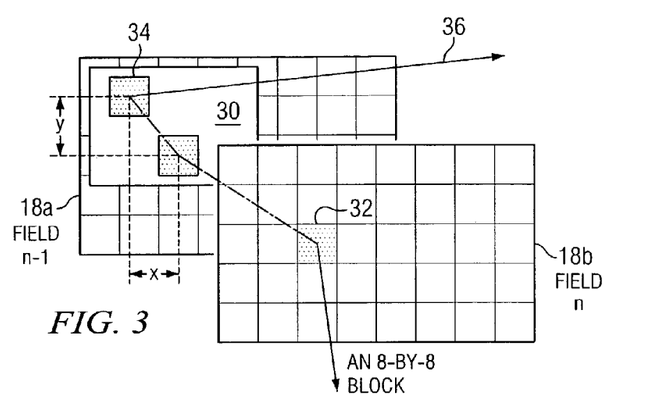
FIG. 3 illustrates an example determination of an estimated motion vector using a block-matching algorithm for a pixel of a portion of a video signal, which may be performed using motion estimator.

FIG. 3 illustrates an example determination of estimated motion vector 30 using a block-matching algorithm for a pixel of portion 18b, which may be performed using motion estimator 28. According to the block-matching algorithm, motion vector 30 (x, y) may be assigned to one block 32 of portion 18b by searching a similar block 34 within a search area 36 in portion 18a. Although described as blocks, block 32 and block 34 may be any suitable size. For example, block 32 and block 34 may each include one pixel, an eight-by-eight block of pixels, or any other suitable set of pixels according to particular needs. The shift of centers of the two blocks 32 and 34 may be the detected corresponding motion vector 30. The error measure to quantify the similarity of block 32 and block 34 may be mean square error, the sum of the absolute differences, or any other suitable error measure. In one embodiment, motion estimator 28 may use both chrominance information 22 and luminance information 26 to determine estimated motion vectors 30. In certain embodiments, motion estimator 28 may use chrominance information 22 only when little false color is detected after chrominance demodulation and low-pass filtering by chrominance demodulator 20.

Returning to FIG. 1A, motion estimator 28 may also determine a motion intensity 38 for the pixels of each portion 18, which may indicate how similar the detected block 34 of portion 18a is to block 32 of portion 18b, for example. A predictor 40 may use the estimated motion vector 30 determined using motion estimator 28 to access chrominance information 22a for the pixel in search area 36 of portion 18a determined to most closely match the pixel of portion 18b. In one embodiment, motion estimator 28 may perform the operations of predictor 40 rather than a separate predictor 40.

Proceeding to FIG. 1B, in one embodiment, system 10 includes a two-dimensional comb filter 46, which may filter chrominance information 22b for a pixel of portion 18b, resulting in two-dimensional comb filter output chrominance information 48. In one embodiment, two-dimensional comb filter 46 may be an adaptive two-dimensional comb filter 46, which may include a vertical (two-dimensional) comb filter and an associated horizontal (one-dimensional) comb filter. The adaptive two-dimensional comb filter 46 may enable the substantial elimination of hanging dots by adaptively switching between the vertical comb filter and its associated horizontal comb filter based upon the content of a portion 18 or series of portions 18, for example.

Figure 4:
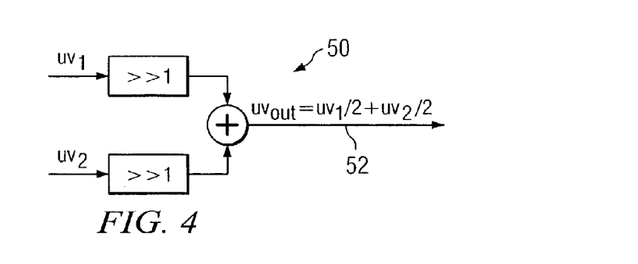
FIG. 4 illustrates an example high level logical architecture for three-dimensional comb filter.

A three-dimensional comb filter 50 may filter chrominance information 22b for a pixel of portion 18b and chrominance information 22a for the pixel in search area 36 of portion 18a determined to most closely match the pixel of portion 18b to determine three-dimensional comb filter output chrominance information 52 for the pixel of portion 18a. FIG. 4 illustrates an example high level logical architecture for three-dimensional comb filter 50. In this example, output chrominance information 52 may equal the sum of half of chrominance information 22b and half of chrominance information 22a. Three-dimensional comb filter 50 may be implemented in any suitable manner according to particular needs. The task of three-dimensional comb filter 50 may be to take the two not yet clean color differences ($u_1$, $v_1$) and ($u_2$, $v_2$) and output the true color differences (U, V).

By eliminating Y and $\theta$ from equations (1.1 and 1.2) discussed above, (U, V) may be obtained as:

$$\Rightarrow \begin{cases} U = 0.5u_1 + 0.5u_2 \\ V = 0.5v_1 + 0.5v_2 \end{cases}$$

Figure 5:
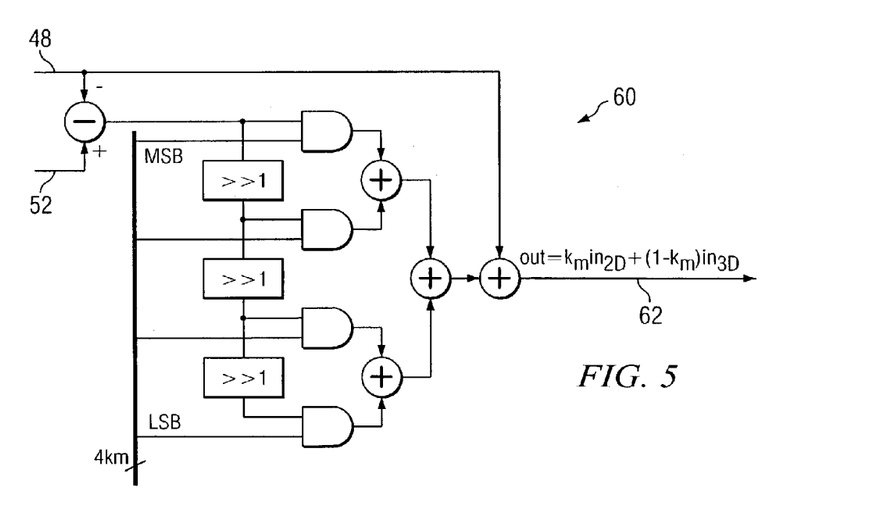
FIG. 5 illustrates an example high level logical architecture for a mixer.

Returning to FIG. 1B, mixer 60 may receive output chrominance information 48 from two-dimensional comb filter 46 and output chrominance information 52 from three-dimensional comb filter 50 and, using motion intensity 38 determined using motion estimator 28, determine output chrominance information 62. FIG. 5 illustrates an example high level logical architecture for mixer 60. In the illustrated example, output chrominance information 62 equals the sum of motion intensity 38 times output chrominance information 48 (first term) and one minus motion intensity 38 times output chrominance information 52 (second term). In one embodiment, mixer 60 may include two notch filters, one for output chrominance information 48 and one for output chrominance information 52, and an interpolator. Mixer 60 may be implemented in any suitable manner according to particular needs.

Returning to FIG. 1B, an output processor 66 may receive output chrominance information 62 from mixer 60 for a pixel of portion 18. In certain embodiments, output processor 66 may apply a color killer and color saturation to output chrominance information 62. Output processor 66 may use output chrominance information 62 to determine output luminance information for the pixel. In one embodiment, output processor 66 may interact with a chrominance modulator 68 to determine output luminance information for the pixel. Chrominance modulator 68 may subtract output chrominance information 62 for the pixel from the portion of video signal 12 corresponding to the pixel to determine output luminance information 70 for the pixel. In certain embodiments, peaking and adjustment of contrast and brightness may also be applied to output luminance information 70. Output processor 66 may wait for output chrominance information 62 and output luminance information 70 to be determined for all pixels of portion 18 before generating output signal 72, which may indicate output chrominance information 62 and output luminance information 70 for each pixel of portion 18.

Although the components of system 10 are described as separate components, those skilled in the art will appreciate that the components of system 10 may be combined, either physically or logically, according to particular needs. As just two examples, mixer 60 and chrominance modulator 68 may be a part of output processor 66 and predictor 40 may be a part of motion estimator 28.

Particular embodiments of the present invention may provide one or more technical advantages. For example, in certain embodiments, motion estimator 28 may determine motion vector 30 between a pixel in a first portion 18 of a video signal 12 (e.g., a current frame) to a corresponding pixel in a second portion 18 of video signal 12 (e.g., a previous frame) having substantially similar luminance information 26 and chrominance information 22. The use of motion estimation may allow three-dimensional comb filter 50 to be applied not only to static pixels, but also to pixels that move from one frame to the next. This capability may substantially reduce or eliminate the need to revert to two-dimensional comb filter 46 when there is pixel motion from one frame to the next, thus increasing the number of pixels in a frame to which three-dimensional comb filter 50 may be applied and possibly maximizing the achievable bandwidth for both luminance information 26 and chrominance information 22. Maximizing the application of three-dimensional comb filter 50 to pixels represented by received video signal 12 may reduce the presence of false color, rainbow swirls, dot crawl on vertical image edges, hanging dots on horizontal image edges, and other problems associated with prior techniques. In certain embodiments, the present invention may improve the quality of the separation of the luminance information 26 from the chrominance information 22 in received video signal 12, such that when the luminance information 26 and chrominance information 22 is applied to a display the picture quality may be improved. For example, such improved picture quality may include sharper images with better definitions and with little false color and vertical resolution loss.

Figure 6A:
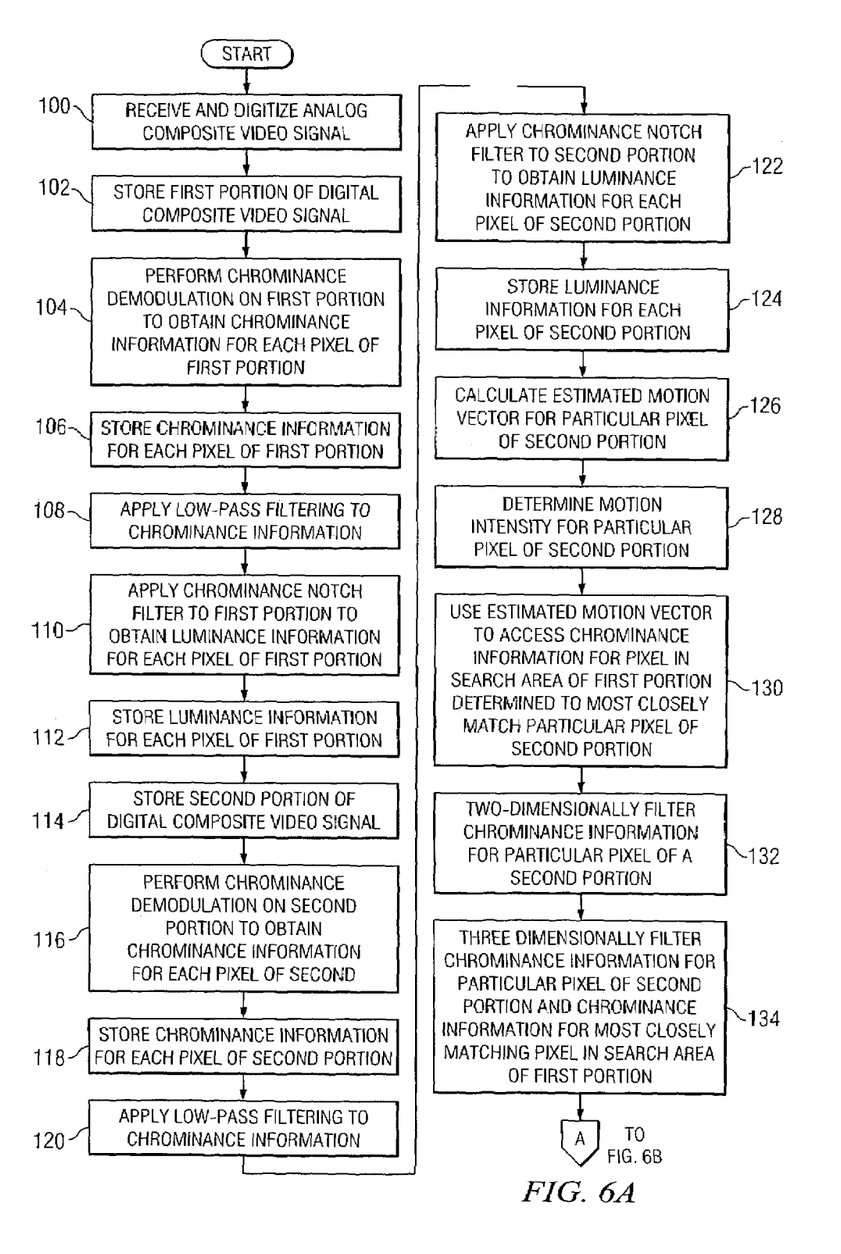
FIG. 6 illustrates an example method for processing a video signal.
Figure 6B:
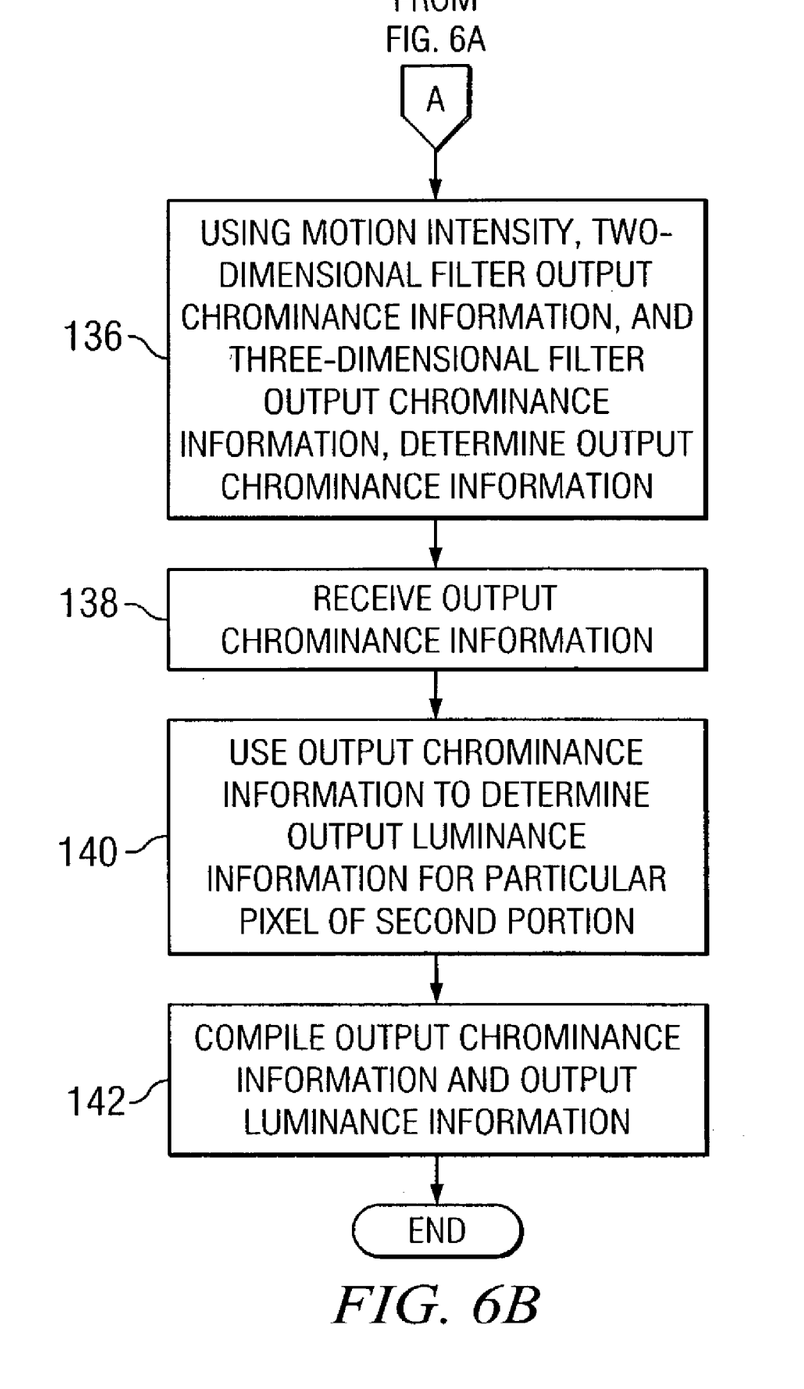

FIG. 6 illustrates an example method for processing video signal 12. At step 100, digitizer 14 receives an analog video signal 12 and digitizes the received analog video signal 12. In one embodiment, received video signal 12 is a digital composite video signal and step 100 may be unnecessary. At step 102, a portion 18a of digital video signal 12 is stored in buffer 16. Although described as a buffer, buffer 16 may include any suitable data storage arrangement. Portion 18a of video signal 12 may include an entire frame, an entire frame plus a number of lines from the immediately subsequent frame, or any other suitable portion of video signal 12 according to particular needs. In one embodiment, portion 18a includes an entire frame plus sixteen lines of the immediately subsequent frame. At step 104, chrominance demodulator 20 may perform chrominance demodulation on portion 18a of video signal 12 stored in buffer 16 to obtain chrominance information 22a for each pixel of portion 18a. For example, chrominance demodulator 20 may access portion 18a and determine chrominance information 22a for each pixel of portion 18a. At step 106, chrominance demodulator 20 may store chrominance information 22a for each pixel of portion 18a as chrominance information 22a. At step 108, chrominance demodulator 20 may also apply low-pass filtering to chrominance information 22a to reduce crosstalk.

At step 110, chrominance notch filter 24 may be applied to portion 18a of video signal 12 to obtain luminance information 26a for each pixel of portion 18a. For example, chrominance notch filter 24 may access portion 18a and determine the chrominance information 22a for each pixel of portion 18a. Chrominance notch filter 24 may subtract the determined chrominance information 22a from video signal 12 to determine luminance information 26a for each pixel of portion 18a. At step 112, chrominance notch filter 24 may store luminance information 26a for each pixel of portion 18a.

At step 114, a portion 18b of digital video signal 12 is stored in buffer 16. Portion 18b of video signal 12 may include an entire frame, an entire frame plus a number of lines from the immediately subsequent frame, or any other suitable portion of video signal 12 according to particular needs. In one embodiment, portion 18b includes an entire frame plus sixteen lines of the immediately subsequent frame. In one embodiment, portion 18b includes at least an immediately subsequent frame to a frame included in portion 18b. At step 116, chrominance demodulator 20 may perform chrominance demodulation on portion 18b of video signal 12 stored in buffer 16 to obtain chrominance information 22b for each pixel of portion 18b. For example, chrominance demodulator 20 may access portion 18b and determine chrominance information 22b for each pixel of portion 18b. At step 118, chrominance demodulator 20 may store chrominance information 22b for each pixel of portion 18b as chrominance information 22b. At step 120, chrominance demodulator 20 may also apply low-pass filtering to chrominance information 22b to reduce crosstalk.

At step 122, chrominance notch filter 24 may be applied to portion 18b of video signal 12 to obtain luminance information 26b for each pixel of portion 18b. For example, chrominance notch filter 24 may access portion 18b and determine the chrominance information 22b for each pixel of portion 18b. Chrominance notch filter 24 may subtract the determined chrominance information 22b from video signal 12 to determine luminance information 26b for each pixel of portion 18b. At step 124, chrominance notch filter 24 may store luminance information 26b for each pixel of portion 18b.

At step 126, motion estimator 28 may calculate an estimated motion vector for a particular pixel of portion 18b. For example, motion estimator 28 may apply an algorithm such as a block matching algorithm that compares chrominance information 22b and luminance information 26b of the particular pixel of portion 18b to chrominance information 22a and luminance information 26a of one or more pixels in search area 36 of portion 18a to determine a pixel in search area 36 of portion 18a that most closely matches the particular pixel of portion 18b. At step 128, motion estimator 28 may determine motion intensity 38 for the particular pixel of portion 18b, which may indicate how similar the detected block 34 in portion 18a is to block 32 in portion 18b, for example. At step 130, predictor 40 may use estimated motion vector 30 calculated by motion estimator 28 to access chrominance information 22a for the pixel in search area 36 of portion 18a determined to most closely match the particular pixel of portion 18b. In one embodiment, motion estimator 28 may perform the operations of predictor 40 rather than a separate predictor 40.

At step 132, two-dimensional comb filter 46 may filter chrominance information 22b for the particular pixel of portion 18b, resulting in two-dimensional filter output chrominance information 48. In one embodiment, two-dimensional comb filter 46 may be an adaptive two-dimensional comb filter 46, which may include a vertical (two-dimensional) comb filter and an associated horizontal (one-dimensional) comb filter. In this embodiment, the adaptive two dimensional comb filter 46 may enable the substantial elimination of hanging dots by adaptively switching between the vertical comb filter and its associated horizontal comb filter based upon the content of a portion 18, for example. At step 134, three-dimensional comb filter 50 may filter chrominance information 22b for the particular pixel of portion 18b and chrominance information 22a for the pixel in search area 36 of portion 18a determined to most closely match the particular pixel of portion 18b to determine three-dimensional filter output chrominance information 52 for the pixel of portion 18a. In one embodiment, three-dimensional filter output chrominance information 52 may equal the sum of half of chrominance information 22b and half of chrominance information 22a. At step 136, mixer 60 may receive output chrominance information 48 from two-dimensional comb filter 46 and output chrominance information 52 from three-dimensional comb filter 50 and, using motion intensity 38 determined using motion estimator 28, determine output chrominance information 62. In one embodiment, output chrominance information 62 equals the sum of motion intensity 38 times output chrominance information 48 (first term) and one minus motion intensity 38 times output chrominance information 52 (second term).

At step 138, output processor 66 may receive output chrominance information 62 from mixer 60 for the particular pixel of portion 18b. In certain embodiments, output processor 66 may apply a color killer and color saturation to output chrominance information 62. At step 140, output processor 66 may use output chrominance information 62 to determine output luminance information 70 for the particular pixel of portion 18b. In one embodiment, output processor 66 may communicate output chrominance information 62 to chrominance modulator 68, which may subtract output chrominance information 62 for the particular pixel of portion 18b from the portion of video signal 12 corresponding to the particular pixel of portion 18b to determine output luminance information 70 for the particular pixel of portion 18b. In this embodiment, chrominance modulator 68 may then communicate luminance information 70 to output processor 66. In certain embodiments, peaking and adjustment of contrast and brightness may also be applied to output luminance information 70. At step 142, output processor 66 may provide output chrominance information 62 and output luminance information 70 for the particular pixel of portion 18b to generate output signal 72 for display of the particular pixel. In one embodiment, output processor 66 may wait for output chrominance information 62 and output luminance information 70 to be determined for all pixels in portion 18b before generating output signal 72, which may indicate output chrominance information 62 and output luminance information 70 for each pixel in portion 18b.

Although the steps of the method are described as occurring in a particular order, the steps may occur in any suitable order according to particular needs. For example, certain steps being performed for a portion 18 or a pixel may be performed while the same or similar steps are being performed for one or more other portions 18 or pixels. In an embodiment where a portion 18 includes a frame for example, all pixels in the frame may be substantially simultaneously processed according to the steps of the method. Furthermore, although the method is described for portion 18a and portion 18b, those skilled in the art will appreciate that video signal 12 may include multiple portions 18 that may be continually processed according to the steps of the method such that multiple portions 18 are stored and processed (i.e. portion 18a, portion 18b, portion 18c, and so on).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for processing a video signal comprising information for a plurality of frames, each frame representing an image and comprising a plurality of pixels, each pixel having luminance information and chrominance information, the system comprising:
   a motion estimator operable to:
      receive the luminance information and chrominance information for each pixel in a first predetermined portion of the video signal, the first predetermined portion comprising at least a first frame;
      store the received luminance information and chrominance information for the pixels in the first predetermined portion of the video signal;
      receive the luminance information and chrominance information for each pixel in a second predetermined portion of the video signal, the second predetermined portion comprising at least a second frame; and
      for each particular pixel of the second predetermined portion, determine an estimated motion vector for the particular pixel of the second predetermined portion by:
         comparing the luminance information and chrominance information of the particular pixel of the second predetermined portion to the stored luminance information and chrominance information for one or more pixels in a search area of the first predetermined portion to determine a pixel in the search area of the first predetermined portion that most closely matches the particular pixel of the second predetermined portion; and
         determining the estimated motion vector according to the particular pixel of the second predetermined portion and the most closely matching pixel in the search area of the first predetermined portion, the estimated motion vector being used to access the chrominance information for the most closely matching pixel in the search area of the first predetermined portion;
   a three-dimensional comb filter operable to filter the chrominance information for the particular pixel of the second predetermined portion and the chrominance information for the most closely matching pixel in the search area of the first predetermined portion to determine three-dimensional filter output chrominance information for the particular pixel of the second predetermined portion; and
   an output processor operable to:
      receive the three-dimensional output chrominance information for the particular pixel of the second predetermined portion;
      if the chrominance information for the particular pixel of the second predetermined portion matches the chrominance information of the most closely matching pixel in the search area of the first predetermined portion within a specified tolerance, use the three-dimensional filter output chrominance information to determine output luminance information for the particular pixel of the second predetermined portion; and
      provide the three-dimensional output chrominance information for the particular pixel and the output luminance information for the particular pixel for displaying the particular pixel.

2. The system of claim 1, wherein the video signal comprises a composite analog video signal and the system further comprises a digitizer operable to receive and digitize the composite analog video signal.

3. The system of claim 1, further comprising a predictor operable to use the estimated motion vector to access the chrominance information for the most closely matching pixel in the search area of the first predetermined portion.

4. The system of claim 1, wherein the motion estimator is further operable to determine a motion intensity for the particular pixel of the second predetermined portion as a measure of the similarity of the particular pixel of the second predetermined portion to the most closely matching pixel in the search area of the first predetermined portion.

5. The system of claim 4, further comprising:
a two-dimensional comb filter operable to filter the chrominance information of the particular pixel of the second predetermined portion to generate two-dimensional filter output chrominance information; and
a mixer operable to determine final output chrominance information for the particular pixel of the second predetermined portion using the motion intensity determined by the motion estimator, the two-dimensional filter output chrominance information, and the three-dimensional output chrominance information.

6. The system of claim 5, wherein if the motion intensity determined by the motion estimator is greater than a predetermined threshold, the mixer determines the final output chrominance information to be equal to the two-dimensional filter output chrominance information.

7. The system of claim 1, wherein the output processor is operable to communicate the three-dimensional filter output chrominance information for the particular pixel in the second predetermined portion to a chrominance modulator, the chrominance modulator operable to subtract the three-dimensional filter output chrominance information for the particular pixel in the second predetermined portion from a portion of the video signal corresponding to the particular pixel in the second predetermined portion to determine the output luminance information for the particular pixel in the second predetermined portion.

8. The system of claim 1, wherein the output processor is further operable to accumulate the three-dimensional output chrominance information and the output luminance information for each pixel in an entire frame before sending an output signal comprising the three-dimensional output chrominance information and the output luminance information for each pixel in the entire frame.

9. The system of claim 1, wherein the video signal comprises a National Television System Committee (NTSC) composite video signal and each frame comprises five hundred twenty-five lines.

10. The system of claim 1, wherein the first predetermined portion and the second predetermined portion each comprise one entire frame and sixteen lines of a next sequential frame.

11. The system of claim 1, wherein the system comprises at least one of:
a television;
a video cassette recorder; and
a laser disc player.

12. A method for processing a video signal comprising information for a plurality of frames, each frame representing an image and comprising a plurality of pixels, each pixel having luminance information and chrominance information, the method comprising:
receiving the luminance information and chrominance information for each pixel in a first predetermined portion of the video signal, the first predetermined portion comprising at least a first frame;
storing the received luminance information and chrominance information for the pixels in the first predetermined portion of the video signal;
receiving the luminance information and chrominance information for each pixel in a second predetermined portion of the video signal, the second predetermined portion comprising at least a second frame;
for each particular pixel of the second predetermined portion, determining an estimated motion vector for the particular pixel of the second predetermined portion by:
comparing the luminance information and chrominance information of the particular pixel of the second predetermined portion to the stored luminance information and chrominance information for one or more pixels in a search area of the first predetermined portion to determine a pixel in the search area of the first predetermined portion that most closely matches the particular pixel of the second predetermined portion; and
determining the estimated motion vector according to the particular pixel of the second predetermined portion and the most closely matching pixel in the search area of the first predetermined portion;
using the estimated motion vector to access the chrominance information for the most closely matching pixel in the search area of the first predetermined portion;
using a three-dimensional comb filter to filter the chrominance information for the particular pixel of the second predetermined portion and the chrominance information for the most closely matching pixel in the search area of the first predetermined portion to determine three-dimensional filter output chrominance information for the particular pixel of the second predetermined portion;
receiving the three-dimensional output chrominance information for the particular pixel of the second predetermined portion;
if the chrominance information for the particular pixel of the second predetermined portion matches the chrominance information of the most closely matching pixel in the search area of the first predetermined portion within a specified tolerance, using the three-dimensional filter output chrominance information to determine output luminance information for the particular pixel of the second predetermined portion; and
providing the three-dimensional output chrominance information for the particular pixel and the output luminance information for the particular pixel for displaying the particular pixel.

13. The method of claim 12, wherein the video signal comprises a composite analog video signal and the system further comprises a digitizer operable to receive and digitize the composite analog video signal.

14. The method of claim 12, further comprising determining a motion intensity for the particular pixel of the second predetermined portion as a measure of the similarity of the particular pixel of the second predetermined portion to the most closely matching pixel in the search area of the first predetermined portion.

15. The method of claim 14, further comprising:
using a two-dimensional comb filter to filter the chrominance information of the particular pixel of the second predetermined portion to generate two-dimensional filter output chrominance information; and
determining final output chrominance information for the particular pixel of the second predetermined portion using the motion intensity, the two-dimensional filter output chrominance information, and the three-dimensional output chrominance information.

16. The method of claim 15, further comprising determining the final output chrominance information to be equal to the two-dimensional filter output chrominance information if the motion intensity greater than a predetermined threshold.

17. The method of claim 12, further comprising subtracting the three-dimensional filter output chrominance information for the particular pixel in the second predetermined portion from a portion of the video signal corresponding to the particular pixel in the second predetermined portion to determine the output luminance information for the particular pixel in the second predetermined portion.

18. The method of claim 12, further comprising accumulating the three-dimensional output chrominance information and the output luminance information for each pixel in an entire frame before sending an output signal comprising the three-dimensional output chrominance information and the output luminance information for each pixel in the entire frame.

19. The method of claim 12, wherein the video signal comprises a National Television System Committee (NTSC) composite video signal and each frame comprises five hundred twenty-five lines.

20. The method of claim 12, wherein the first predetermined portion and the second predetermined portion each comprise one entire frame and sixteen lines of a next sequential frame.

21. The method of claim 12, wherein the method is executed by one or more components of at least one of:
 a television;
 a video cassette recorder; and
 a laser disc player.

22. Logic encoded in media for processing a video signal comprising information for a plurality of frames, each frame representing an image and comprising a plurality of pixels, each pixel having luminance information and chrominance information, the logic when executed operable to:
 receive the luminance information and chrominance information for each pixel in a first predetermined portion of the video signal, the first predetermined portion comprising at least a first frame;
 store the received luminance information and chrominance information for the pixels in the first predetermined portion of the video signal;
 receive the luminance information and chrominance information for each pixel in a second predetermined portion of the video signal, the second predetermined portion comprising at least a second frame;
 for each particular pixel of the second predetermined portion, determine an estimated motion vector for the particular pixel of the second predetermined portion by:
  comparing the luminance information and chrominance information of the particular pixel of the second predetermined portion to the stored luminance information and chrominance information for one or more pixels in a search area of the first predetermined portion to determine a pixel in the search area of the first predetermined portion that most closely matches the particular pixel of the second predetermined portion; and
  determining the estimated motion vector according to the particular pixel of the second predetermined portion and the most closely matching pixel in the search area of the first predetermined portion;
 use the estimated motion vector to access the chrominance information for the most closely matching pixel in the search area of the first predetermined portion;
 use a three-dimensional comb filter to filter the chrominance information for the particular pixel of the second predetermined portion and the chrominance information for the most closely matching pixel in the search area of the first predetermined portion to determine three-dimensional filter output chrominance information for the particular pixel of the second predetermined portion;
 receive the three-dimensional output chrominance information for the particular pixel of the second predetermined portion;
 if the chrominance information for the particular pixel of the second predetermined portion matches the chrominance information of the most closely matching pixel in the search area of the first predetermined portion within a specified tolerance, use the three-dimensional filter output chrominance information to determine output luminance information for the particular pixel of the second predetermined portion; and
 provide the three-dimensional output chrominance information for the particular pixel and the output luminance information for the particular pixel for displaying the particular pixel.

23. The logic of claim 22, wherein the video signal comprises a composite analog video signal and the system further comprises a digitizer operable to receive and digitize the composite analog video signal.

24. The logic of claim 22, further operable to determine a motion intensity for the particular pixel of the second predetermined portion as a measure of the similarity of the particular pixel of the second predetermined portion to the most closely matching pixel in the search area of the first predetermined portion.

25. The logic of claim 24, further operable to:
 use a two-dimensional comb filter to filter the chrominance information of the particular pixel of the second predetermined portion to generate two-dimensional filter output chrominance information; and
 determine final output chrominance information for the particular pixel of the second predetermined portion using the motion intensity, the two-dimensional filter output chrominance information, and the three-dimensional output chrominance information.

26. The logic of claim 25, further operable to determine the final output chrominance information to be equal to the two-dimensional filter output chrominance information if the motion intensity greater than a predetermined threshold.

27. The logic of claim 22, further operable to subtract the three-dimensional filter output chrominance information for the particular pixel in the second predetermined portion from a portion of the video signal corresponding to the particular pixel in the second predetermined portion to determine the output luminance information for the particular pixel in the second predetermined portion.

28. The logic of claim 22, further operable to accumulate the three-dimensional output chrominance information and the output luminance information for each pixel in an entire frame before sending an output signal comprising the three-dimensional output chrominance information and the output luminance information for each pixel in the entire frame.

29. The logic of claim 22, wherein the video signal comprises a National Television System Committee (NTSC) composite video signal and each frame comprises five hundred twenty-five lines.

30. The logic of claim 29, wherein the first predetermined portion and the second predetermined portion each comprise one entire frame and sixteen lines of a next sequential frame.

31. The logic of claim 22, wherein the logic is executed by one or more components of at least one of:
 a television;
 a video cassette recorder; and
 a laser disc player.

* * * * *